United States Patent [19]

Kuriyama

[11] Patent Number: 5,559,668
[45] Date of Patent: Sep. 24, 1996

[54] PACKAGE-TYPE SOLID ELECTROLYTIC CAPACITOR

[75] Inventor: Chojiro Kuriyama, Kyoto, Japan

[73] Assignee: Rohm Co., Ltd., Kyoto, Japan

[21] Appl. No.: 428,421

[22] Filed: Apr. 25, 1996

Related U.S. Application Data

[63] Continuation-in-part of Ser. No. 214,190, Mar. 17, 1994, abandoned.

[30] Foreign Application Priority Data

Mar. 25, 1993 [JP] Japan ................................ 5-66610

[51] Int. Cl.⁶ ................................................. H01G 9/012
[52] U.S. Cl. ............................................. 361/533; 361/540
[58] Field of Search ........................... 361/523, 528, 361/529, 532, 533, 534, 535, 537, 538, 539, 540

[56] References Cited

U.S. PATENT DOCUMENTS

| | | | |
|---|---|---|---|
| 4,179,725 | 12/1979 | Maguire | 361/540 |
| 4,288,842 | 9/1981 | Voyles | 361/540 |
| 4,330,929 | 5/1982 | Cripe | 361/536 |
| 4,375,075 | 2/1983 | Escher et al. | 361/534 |
| 4,539,623 | 9/1985 | Irikura et al. | 361/540 |
| 4,578,737 | 3/1986 | Westermann | 361/308.1 |
| 4,589,058 | 5/1986 | Peternell et al. | 361/533 |
| 4,660,127 | 4/1987 | Gunter | 361/540 |
| 4,675,790 | 6/1987 | DeMatos et al. | 361/540 |
| 4,959,754 | 9/1990 | Stufler et al. | 361/527 |
| 5,005,107 | 4/1991 | Kobashi et al. | 361/540 |
| 5,478,965 | 12/1995 | Hashiba | 361/534 |

FOREIGN PATENT DOCUMENTS

| | | | |
|---|---|---|---|
| 46-16856 | 5/1971 | Japan | 361/529 |
| 53-157546 | 12/1976 | Japan | 361/529 |
| 4-78121 | 3/1992 | Japan | 361/535 |
| 4-208510 | 7/1992 | Japan | 361/306.1 |

*Primary Examiner*—Teresa J. Walberg
*Assistant Examiner*—Gregory L. Mills
*Attorney, Agent, or Firm*—William H. Eilberg

[57] ABSTRACT

A package-type solid electrolytic capacitor is provided which comprises: a capacitor chip having a first end and a second end opposite to the first end, the chip being formed with a cathode terminal coating at least covering the second end; an anode wire partially projecting from the first end of the chip; a plate-like metal anode lead having an inner end electrically connected to the anode wire; a plate-like metal cathode lead having an inner end electrically connected to the cathode terminal coating of the chip; and a resin package enclosing the capacitor chip, the anode wire and the inner ends of the anode and cathode leads. The cathode lead has a wider portion projecting out of the resin package, and the inner end of the cathode lead is narrower and held in abutment with and electrically connected to the cathode terminal coating at the second end of the chip.

10 Claims, 8 Drawing Sheets

PACKAGE-TYPE SOLID ELECTROLYTIC CAPACITOR

CROSS REFERENCE TO RELATED APPLICATION

This is a continuation-in-part of application Ser. No. 08/212,190 filed Mar. 17, 1994 now abandoned.

BACKGROUND OF THE INVENTION

1. Field of the Invention

This invention relates to a solid electrolytic capacitor, such as tantalum capacitor or aluminum capacitor, which comprises a capacitor element enclosed in a resin package.

2. Description of the Prior Art

A package-type solid electrolytic capacitor is known from Japanese Patent Application Laid-open No. 60-220922 for example. The capacitor disclosed in this Japanese document has such a structure, as shown in FIG. 15.

Specifically, the prior art capacitor comprises a capacitor element 11 which includes a capacitor chip 11a and an anode wire 11b partially projecting from the chip 1a. The chip may be a compacted mass of tantalum powder for example, in which case the anode wire 11b is also made of tantalum.

The capacitor also includes an anode lead 12 and a cathode lead 13. The anode lead 12 has an inner end 12a electrically connected, from below, to the anode wire 11b by welding for example. The cathode lead 13 has an inner end 13a held in contact with the underside of the chip 11a and electrically connected thereto by a solidified conductive paste 14 such as metal paste or electrically conductive resin paste.

The capacitor further includes a resin package 15 enclosing the capacitor element 11 together with part of the anode and cathode leads 12, 13. The respective leads 12, 13 are bent toward the underside of the resin package 15 for conveniently mounting to a surface of a circuit board (not shown).

According to the prior art arrangement described above, since the inner end 13a of the cathode lead 13 is attached to the underside of the chip 11a, the cathode lead is required to have an inclined bent portion 13b extending from the inner end. Thus, the overall length L' of the capacitor must be increased due to the presence of the inclined bent portion 13b. Further, since the dimension H1' below the chip 11a need be increased by an amount corresponding to the thickness of the cathode lead 13 plus the thickness of the conductive paste 14, the overall height H' of the capacitor must be correspondingly increased. As a result, there is a relatively high limitation in reducing the size and weight of the capacitor.

Further, with the prior art capacitor, the conductive paste 14 is substantially concealed by the inner end 13a of the cathode lead 13, thereby preventing the use of laser beam irradiation for solidification of the conductive paste 14. Instead, the capacitor element 11 as a whole need be heated for a prolonged period of time to solidify the conductive paste. As a result, the capacitor element 11 may be thermally damaged at the time of solidifying the conductive paste 14.

FIG. 16 shows another prior art package-type solid electrolytic capacitor. Again, this capacitor comprises a capacitor element 11 which includes a capacitor chip 11a and an anode wire 11b partially projecting from the chip 1a.

The capacitor also includes an anode lead 12' and a cathode lead 13'. The anode lead 12' has an inner end 12a electrically connected, from above, to the anode wire 11b' by welding. The cathode lead 13' has an inner end 13a' held in contact with the underside of the chip 11a' and electrically connected thereto by a solidified conductive paste 14'. Further, the cathode lead 13' has an inclined bent portion 13b' extending from the inner end 13a.

The capacitor further includes a resin package 15' enclosing the capacitor element 11' together with part of the anode and cathode leads 12', 13'. The respective leads 12', 13' are bent toward the underside of the resin package 15' for conveniently mounting to a surface of a circuit board.

Obviously, due to the need for attaching the inner end 13' of the cathode lead 13' to the upper surface of the chip 11a' and for providing the inclined bent portion 13b', there is a relatively high limitation in reducing the overall length L" and height H" of the capacitor.

SUMMARY OF THE INVENTION

It is, therefore, an object of the present invention to provide a package-type solid electrolytic capacitor which can be reduced in size and weight in comparison with the prior art capacitors.

Another object of the present invention is to provide a package-type solid electrolytic capacitor wherein a cathode lead can be held in proper electrical and mechanical contact with a cathode terminal coating of a capacitor chip even if the coating is recessed at a portion thereof for contact with the cathode lead.

According to the present invention, there is provided a package-type solid electrolytic capacitor comprising: a capacitor chip having a first end and a second end opposite to the first end, the chip being formed with a cathode terminal coating at least covering the second end; an anode wire partially projecting from the first end of the chip; a plate-like metal anode lead having an inner end electrically connected to the anode wire; a plate-like metal cathode lead having an inner end electrically connected to the cathode terminal coating of the chip; and a resin package enclosing the capacitor chip, the anode wire and the inner ends of the anode and cathode leads; wherein the cathode lead has a wider portion projecting out of the resin package, the inner end of the cathode lead being narrower and held in abutment with and electrically connected to the cathode terminal coating at the second end of the chip.

The inner end of the cathode lead may be rendered narrower by tapering the inner end of the cathode lead. Alternatively, the inner end of the cathode lead may be rendered narrower by rectangularly or obliquely cutting out the cathode lead on one or both sides of the inner end of the cathode lead.

Other objects, features and advantages of the present invention will be fully understood from the following detailed description given with reference to the accompanying drawings.

DETAILED DESCRIPTION OF THE PREFERRED EMBODIMENTS

Figure 1:
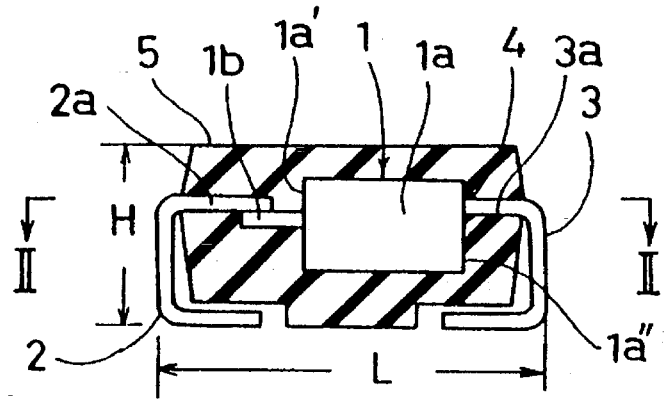
FIG. 1 is a front view, in vertical section, showing a package-type solid electrolytic capacitor according to a first embodiment of the present invention.
Figure 2:
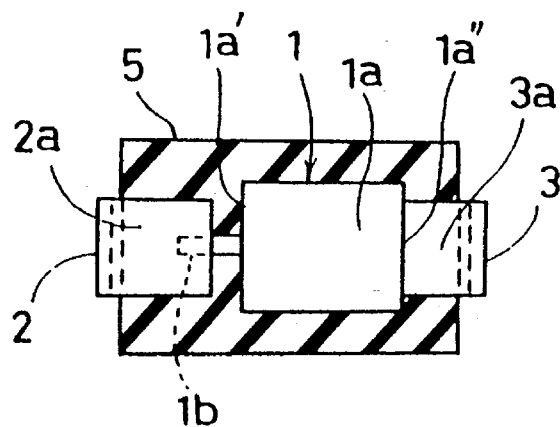
FIG. 2 is a section taken along lines II—II in FIG. 1.

Referring first to FIGS. 1 and 2 of the accompanying drawings, there is shown a package-type solid electrolytic capacitor according to a first embodiment of the present invention. The capacitor may be a tantalum capacitor or an aluminum capacitor for example.

The capacitor of the first embodiment comprises a capacitor element 1 which includes a chip 1a and an anode wire 1b partially projecting from a first end face 1a' of the chip 1a. The chip 1a has a second end face 1a" opposite to the first end face 1a'. The chip 1a may be a compacted mass of tantalum powder for example, in which case the anode wire 1b is also made of tantalum.

The capacitor also includes an anode lead 2 and a cathode lead 3. The anode lead 2 has an inner end 2a electrically connected, from above, to the anode wire 1b by welding for example. The cathode lead 3 has an inner end 3a held in abutment with and electrically connected to the second end face 1a" of the chip 1a. The electrical connection between the cathode lead 3 and the chip 1a may be established by a solidified conductive paste 4 such as metal paste (e.g. solder paste or silver paste) or electrically conductive resin paste (e.g. epoxy resin containing silver or nickel particles).

According to the first embodiment, the inner ends 2a, 3a of the respective leads 2, 3 are held in a same (common) plane. The reason for this is that both of the leads 2, 3 are originally separated from a common lead frame (not shown in FIGS. 1 and 2), as described later.

The capacitor element 1 together with the inner ends 2a, 3a of the respective leads 2, 3 are enclosed in a package 5 of synthetic resin. The remaining (projecting) portions of the respective leads 2, 3 are bent toward the underside of the resin package 5 for conveniently mounting to a surface of a printed circuit board (not shown).

According to the arrangement of the first embodiment, the inner end 3a of the cathode lead 3 is attached to the second end face 1a" of the chip 1a opposite to the first end face 1a' from which the anode wire 1b projects. Thus, the cathode lead 3 need not have an inclined bent portion within the resin package 5, as opposed to the prior art arrangement shown in FIG. 6 or 7. As a result, it is possible to correspondingly reduce the overall length L (see FIG. 1) and weight of the capacitor while also saving the materials required for the cathode lead 3 and the resin package 5.

Further, the thickness of the cathode lead 3 is not additional to the height of the capacitor, as opposed to the prior art arrangement of FIG. 6 or 7 wherein the inner end 13a, 13a' of the cathode lead 13, 13' is located below or above the chip 11a. Thus, it is possible to correspondingly reduce the overall height H (FIG. 1) of the solid electrolytic capacitor.

Figure 3:
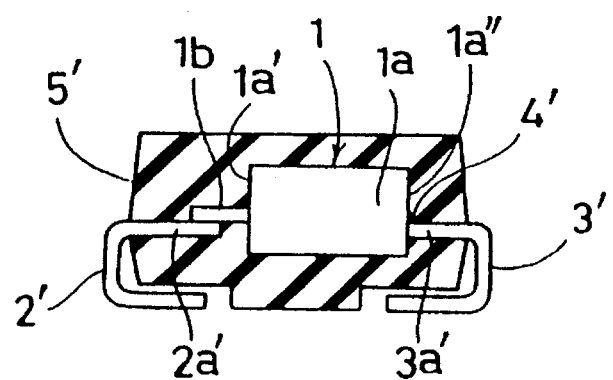
FIG. 3 is a front view, in vertical section, showing a package-type solid electrolytic capacitor according to a second embodiment of the present invention.

FIG. 3 shows a solid electrolytic capacitor according to a second embodiment of the present invention. The capacitor of this embodiment differs from that of the first embodiment in the following respects.

First, an anode lead 2' is made to have an inner end 2a' electrically connected, from below, to the anode wire 1a by welding for example. As a result, the position of the inner end 2a' is shifted downward (in comparison with the first embodiment), and the length of the anode lead 2 as a whole is correspondingly reduced.

Secondly, a cathode lead 3' is also made to have an inner end 3a' which is shifted downward to be positioned in the same plane as the inner end 2a' of the anode lead 2'. As a result, the length of the cathode lead 3' as a whole is correspondingly reduced. Similarly to the first embodiment, the inner end 3a' of the cathode lead 3' is held in abutment with and electrically connected to the second end face 1a" of the chip 1a by means of a solidified conductive paste 4' such as solder paste, silver paste or electrically conductive resin paste (e.g. epoxy resin containing silver or nickel particles).

In the third place, a resin package 5' enclosing the capacitor element 1 together with the inner ends 2a', 3a' of the respective leads 2', 3' is differently shaped in comparison with the resin package 5 of the first embodiment due to the downward shifting of the inner ends of the respective leads.

According to the arrangement of the second embodiment, the inner end 3a' of the cathode lead 3 is attached to the second end face 1a" of the chip 1a without any need for an inclined bent portion. Therefore, the capacitor of the second embodiment has the same advantages as that of the first embodiment.

Figure 4:
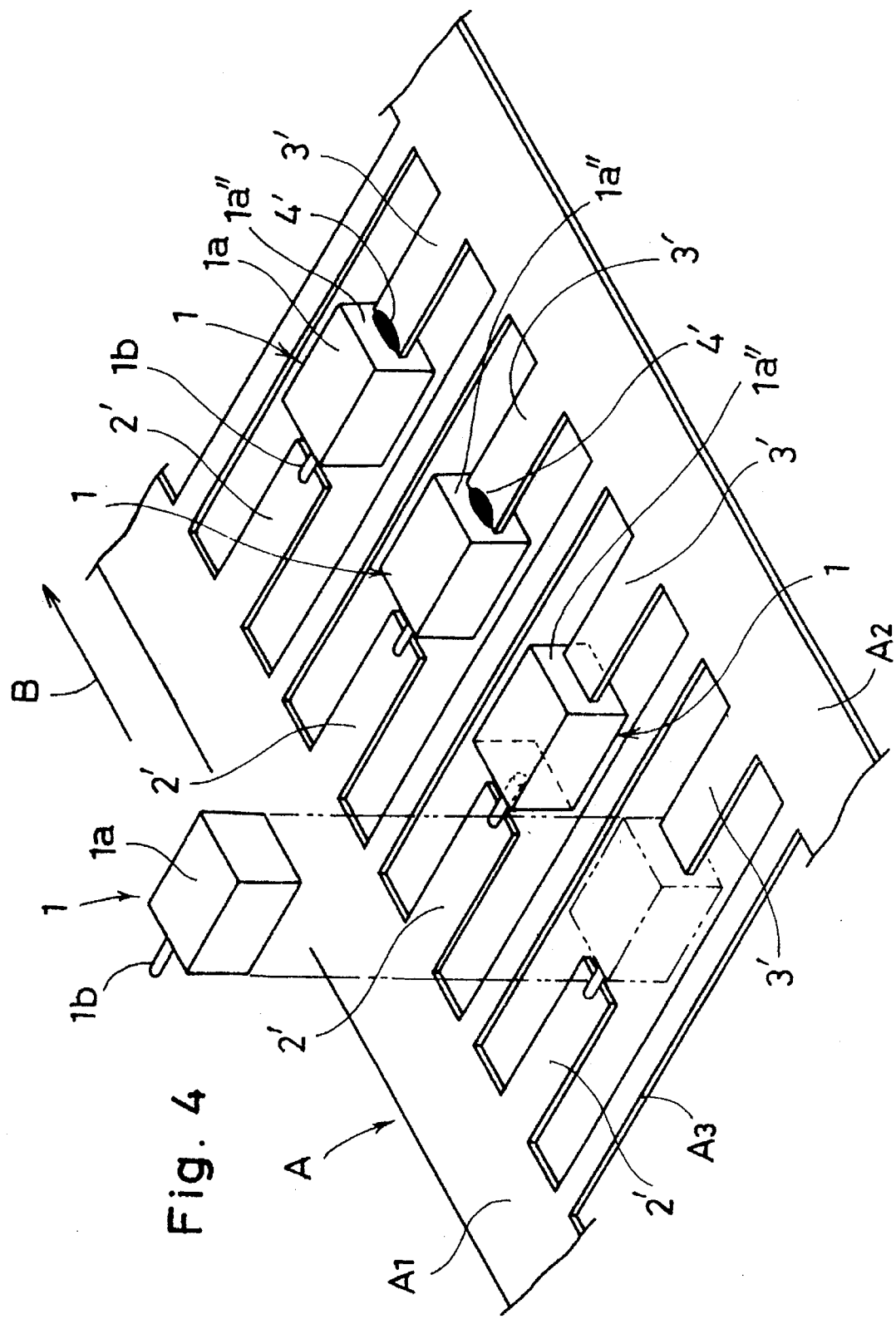
FIG. 4 is a perspective view showing a method of making the capacitor shown in FIG. 3.

FIG. 4 shows the successive steps of making the solid electrolytic capacitor of the second embodiment.

As shown in FIG. 4, use is made of a leadframe A for making a plurality of capacitors. The leadframe A comprises a first side band A1 and a second side band A2 integrally connected together by section bars A3 spaced longitudinally of the leadframe at constant spacing. The first side band A1 is integrally formed with anode leads 2' extending toward the second side band A2 between the respective section bars A3. Similarly, the second side band A2 is integrally formed with cathode leads 3' extending toward the first side band A1 between the respective section bars A3 in pairing relation to the anode leads 2'. The leadframe A is transferred in the direction of an arrow B, and the following process steps are performed during such transfer.

In a first step, a plurality of capacitor elements 1 are successively supplied to the respective pairs of anode and cathode leads 2', 3' from above. At this time, the chip 1a of each capacitor element 1 is positioned between the corresponding pair of anode and cathode leads 2', 3' with the second end face 1a" held in contact with the cathode lead 3', whereas the anode wire 1b is made to rest on the anode lead 2' from above.

In a second step, the anode wire 1b of the capacitor element 1 is electrically connected to the corresponding anode lead 2' by welding for example.

In a third step, a suitable amount of conductive paste 4' (e.g. solder paste, silver paste or electrically conductive resin paste) is applied to the position of contact between the chip 1a and the corresponding cathode lead 3'. At this time, the paste may be applied to one or both of the upper and lower surfaces of the cathode lead 3'.

In a fourth step, the paste 4' is caused to solidify by laser beam irradiation for example, thereby establishing connection between the chip 1a and the corresponding cathode lead 3'. The laser beam irradiation for solidification is possible because the paste 4' is exposed (not concealed by the cathode lead 3'), as shown in FIG. 4. Obviously, such a manner of solidification is advantageous in reducing the amount of heat generated at the time of solidification in comparison with direct heating, thereby reducing the likelihood of thermally damaging the capacitor element 1.

In a fifth step, a resin package 5' (see FIG. 3) is formed for the capacitor element 1.

In a sixth step, the obtained capacitor is separated from the leadframe A by cutting the pair of anode and cathode leads 2', 3' at positions thereof for connection to the respective side bands A1, A2.

In a seventh (final) step, the respective portions of the anode and cathode leads 2', 3' are bent toward the underside of the resin package 5' (see FIG. 3), thereby obtaining a final product.

Obviously, the capacitor of the first embodiment (FIGS. 1 and 2) can be made substantially in the same way as that of the second embodiment.

Figure 5:
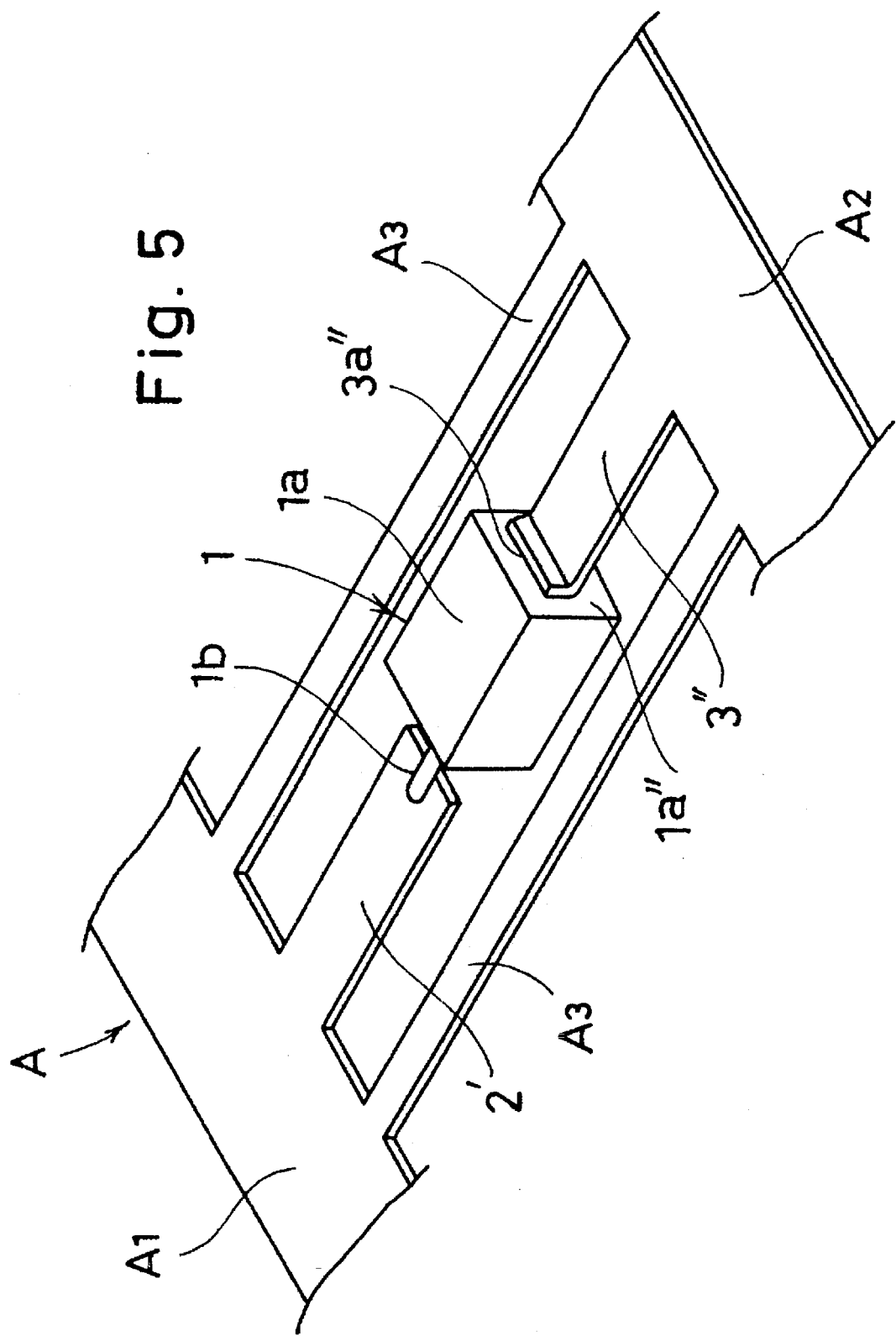
FIG. 5 is a perspective view showing another method of making a package-type solid electrolytic capacitor according to a third embodiment of the present invention.

FIG. 5 shows a third embodiment which differs from the second embodiment (FIGS. 3 and 4) only in that a cathode lead 3" is made to have an integral contact end flange 3a" for abutment with the second end face 1a" of the chip 1a. The end flange may be connected to the second end face of the chip by applying a conductive paste (e.g. solder paste, silver paste or electrically conductive resin paste).

According to the arrangement of the third embodiment, the contact end flange 3a" provides an increased contact or bonding area. Thus, the third embodiment is advantageous in that the connection between the chip 1a and the cathode lead 3" is very strong and reliable.

Figure 6:
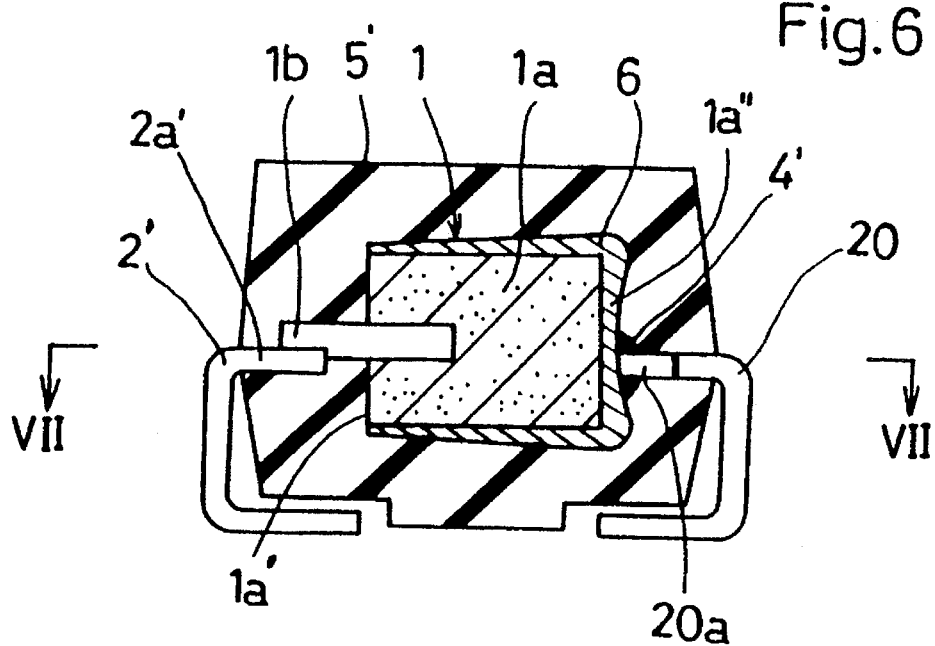
FIG. 6 is a front view, in vertical section, showing a package-type solid electrolytic capacitor according to a fourth embodiment of the present invention.
Figure 7:
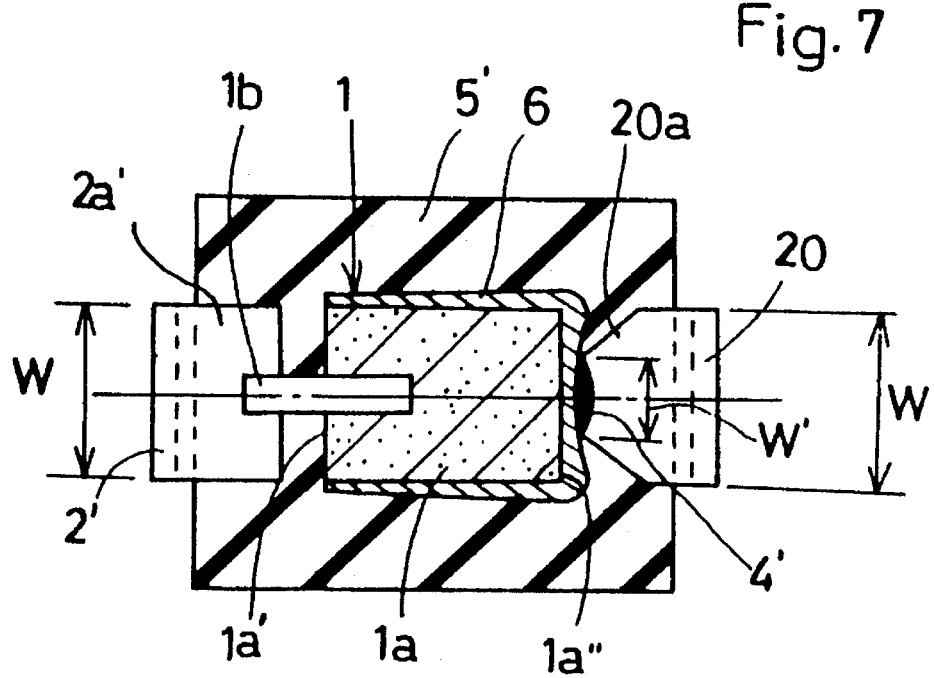
FIG. 7 is a section taken along lines VII—VII in FIG. 6.

FIGS. 6 and 7 show a package-type solid electrolytic capacitor according to a fourth embodiment of the present invention. The capacitor of this embodiment comprises a capacitor element 1 which includes a chip 1a and an anode wire 1b partially projecting from a first end 1a' of the chip 1a. The chip 1a has a second end 1a" opposite to the first end 1a'.

According to the fourth embodiment, the capacitor chip 1a is shown to have a cathode terminal coating 6 which actually comprises a solid electrolyte layer, a graphite conditioning layer, and a metal layer made of nickel for example. As shown in FIGS. 6 and 7, the cathode terminal coating 6 has a tendency to be recessed at the second end 1a". This tendency is attributable to the fact that the solid electrolyte layer is formed by repetitive steps of dipping the chip 1a in a chemical solution (e.g. manganese nitrate solution) with the anode wire 1b directed vertically upward and thereafter baking the chip 1a for drying, so that the chemical solution tends to gravitationally collect at the lower chip edge.

The capacitor also includes an anode lead 2' and a cathode lead 20, each of which is made of a metal plate and has a width W. The anode lead 2', which is substantially constant in width over the entire length thereof, has an inner end 2a' electrically connected, from below, to the anode wire 1b by welding for example, in the same manner as in the second embodiment shown in FIG. 3.

On the other hand, the cathode lead 20 has a wider normal portion with the above-mentioned width W, and a narrower inner end 20a with a width W'. The narrower inner end 20a of the cathode lead 20 is held in abutment with and electrically connected to the recessed portion of the cathode terminal coating 6 at the second end 1a" of the chip 1a. The electrical connection between the cathode lead 3 and the coating 6 may be established by a solidified conductive paste 4' such as metal paste (e.g. solder paste or silver paste) or electrically conductive resin paste (e.g. epoxy resin containing silver or nickel particles).

According to the fourth embodiment, the narrower inner end 20a of the cathode lead 20 is provided by tapering. The minimum width W' of the narrower inner end 20a may be preferably about half the width W of the wider normal portion of the cathode lead 20.

As shown in FIG. 6, the inner ends 2a', 20a of the respective leads 2', 20 are held in a same (common) plane. The reason for this is that both of the leads 2', 20 are originally separated from a common lead frame (not shown in FIGS. 6 and 7).

The capacitor element 1 together with the inner ends 2a', 20a of the respective leads 2', 20 are enclosed in a package 5' of synthetic resin. The remaining (projecting) portions of the respective leads 2', 20 are bent toward the underside of the resin package 5' for conveniently mounting to a surface of a printed circuit board (not shown).

Figure 8:
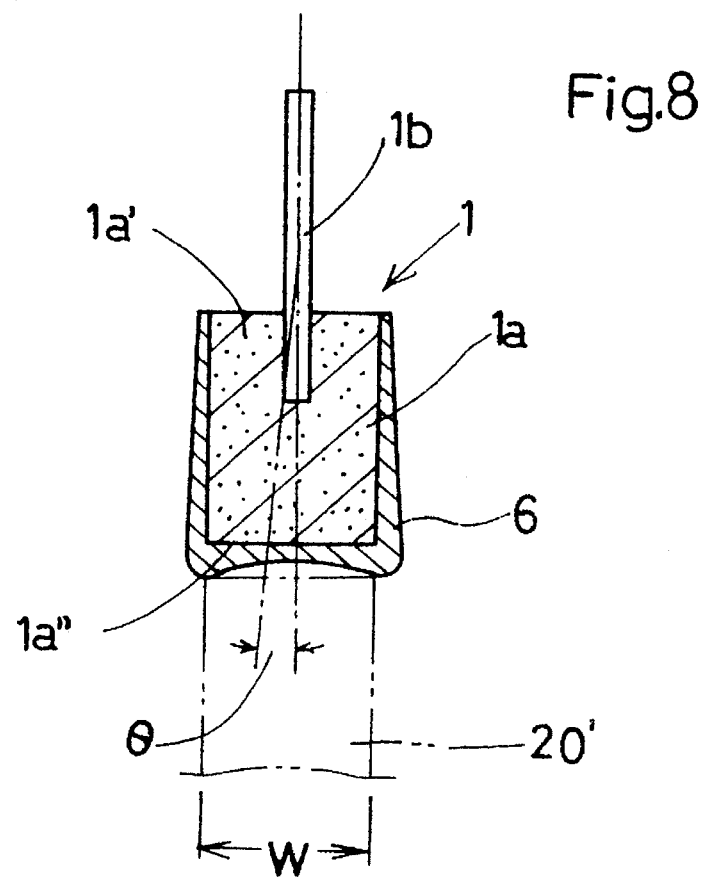
FIG. 8 is a sectional view illustrating the problems to be solved by the capacitor shown in FIGS. 6 and 7.

As shown in FIG. 8, if use is made of a relatively wide cathode lead 20' which has a constant width W over the entire length thereof, the cathode lead 20' may contact the cathode terminal coating 6 only at two front corners of the cathode lead 20' with a relatively large gap formed between the cathode lead 20' and the recessed portion of the coating 6. As a result, air may be likely to be trapped in a solder or conductive adhesive deposit which is subsequently applied for attaching the cathode lead 20' to the coating 6, thereby leading to improper mechanical and electrical connection between the cathode lead 20' and the coating 6. Further, the front corners of the cathode lead 20' may damage the coating 6 to result in a quality deterioration.

In particular, if the chip element 1 angularly deviates by an angle θ due to a mounting error which may be caused by an undesirable deformation of the anode wire 1b, the above-described problems become even more serious due to enlargement of the above-described gap and due to additional localization of the contact. While it is conceivable to solve these problems by reducing the width of the cathode lead 20' as a whole, such a solution will lead to a new problem that the portion of the cathode lead 20' projecting out of the resin package (see the element 5' in FIG. 6) cannot provide a sufficient mounting (contact) area.

According to the arrangement of the fourth embodiment shown in FIGS. 6 and 7, the inner end 20a of the cathode lead 20 is rendered narrow while making the projecting portion of the cathode lead sufficiently wide. Thus, the narrower inner end 20a of the cathode lead 20 can be brought into proper contact with the recessed portion of the cathode terminal coating 6 with less likelihood of damaging the coating even if the capacitor element 1 angularly deviates slightly due to a mounting error.

Figure 9:
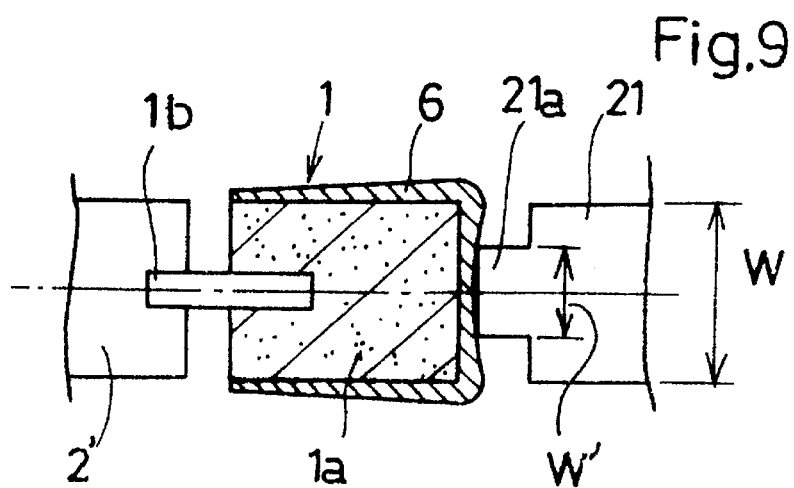
FIG. 9 is a front view, in vertical section, showing a package-type solid electrolytic capacitor according to a fifth embodiment of the present invention.

FIG. 9 shows a solid electrolytic capacitor according to a fifth embodiment of the present invention. The capacitor of this embodiment differs from that of the fourth embodiment only in that a cathode lead 21 has a narrower inner end 21a which is formed by rectangularly cutting out the cathode lead on both sides of the the inner end 21a.

Figure 10:
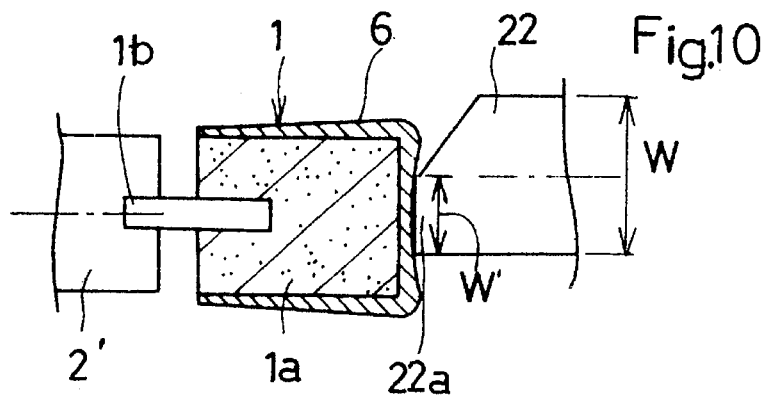
FIG. 10 is a front view, in vertical section, showing a package-type solid electrolytic capacitor according to a sixth embodiment of the present invention.

FIG. 10 shows a solid electrolytic capacitor according to a sixth embodiment of the present invention. The capacitor of this embodiment differs from that of the fourth embodiment only in that a cathode lead 22 has a narrower inner end 22a which is formed by obliquely cutting out the cathode lead only on one side of the the inner end 22a, and that the cathode lead 22 is laterally offset relative to the anode lead 2'.

Figure 11:
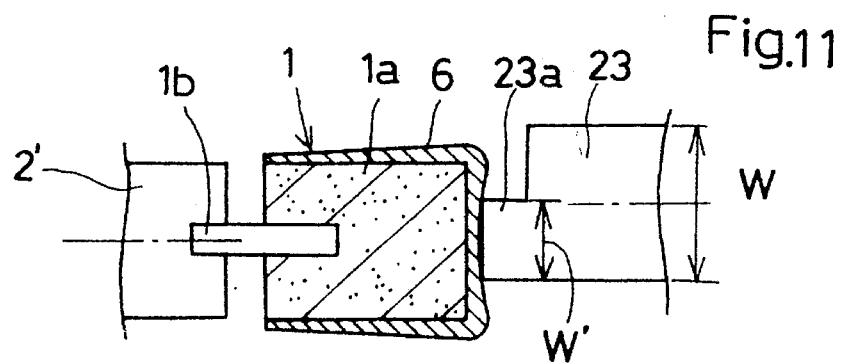
FIG. 11 is a front view, in vertical section, showing a package-type solid electrolytic capacitor according to a seventh embodiment of the present invention.

FIG. 11 shows a solid electrolytic capacitor according to a seventh embodiment of the present invention. The capacitor of this embodiment differs from that of the fourth embodiment only in that a cathode lead 23 has a narrower inner end 23a which is formed by rectangularly cutting out the cathode lead only on one side of the the inner end 23a, and that the cathode lead 23 is laterally offset relative to the anode lead 2'.

Figure 12:
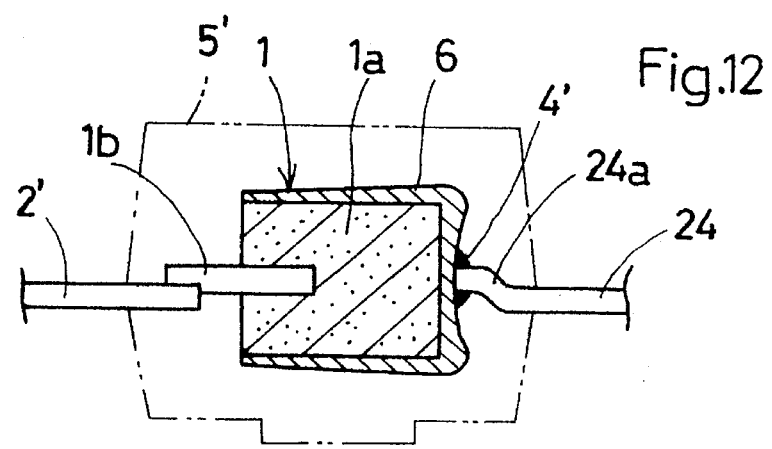
FIG. 12 is a front view, in vertical section, showing a package-type solid electrolytic capacitor according to a eighth embodiment of the present invention.

FIG. 12 shows a solid electrolytic capacitor according to a eighth embodiment of the present invention. The capacitor of this embodiment differs from that of the fourth embodiment only in that a cathode lead 24 has a narrower inner end 24a which is slightly bent downward for preventing removal of the cathode lead 24 from the resin package 5'.

Figure 13:
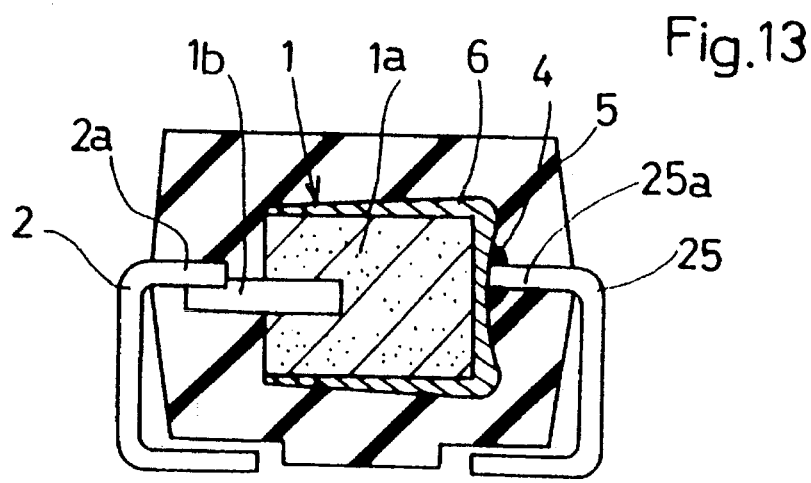
FIG. 13 is a front view, in vertical section, showing a package-type solid electrolytic capacitor according to a ninth embodiment of the present invention.

According to a ninth embodiment of the present invention shown in FIG. 13, an anode lead 2 has an inner end 2a which is welded to the anode wire 1b of the capacitor element 1 from above. A cathode lead 25 used in this embodiment is made to have a narrower inner end 25a which is similar to that shown in FIGS. 6 and 7.

Figure 14:
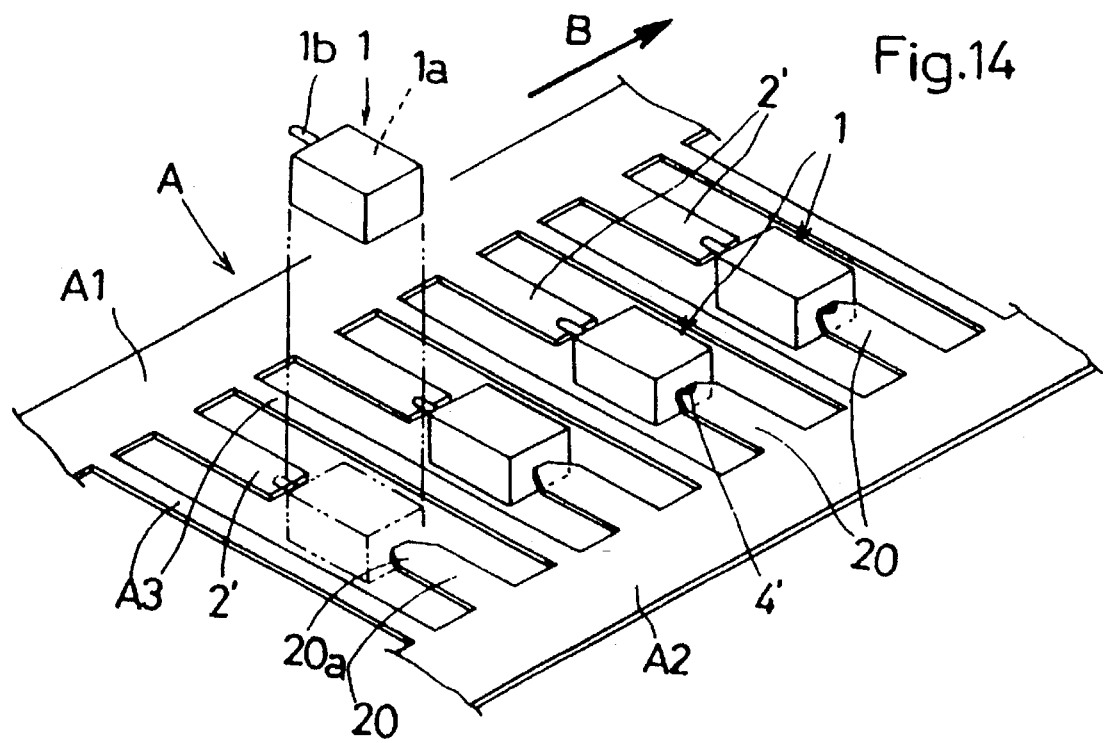
FIG. 14 is a view, in vertical section, showing a prior art package-type solid electrolytic capacitor.
Figure 15:
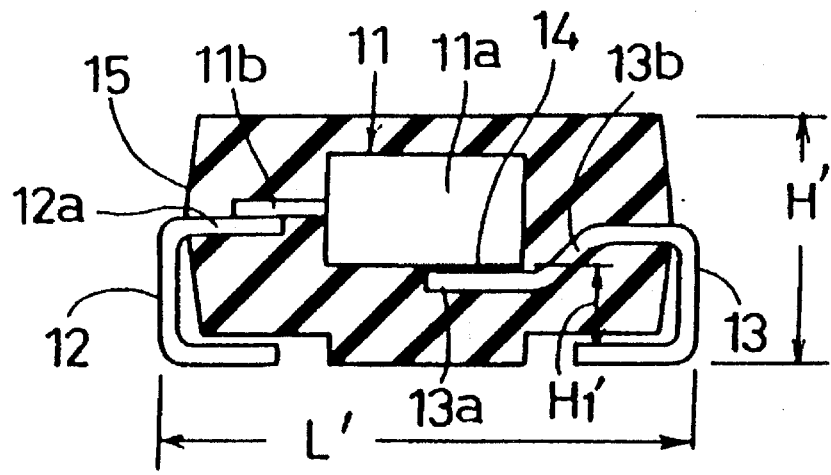
FIG. 15 and 16 are views, in vertical section, showing other prior art package-type solid electrolytic capacitors.
Figure 16:
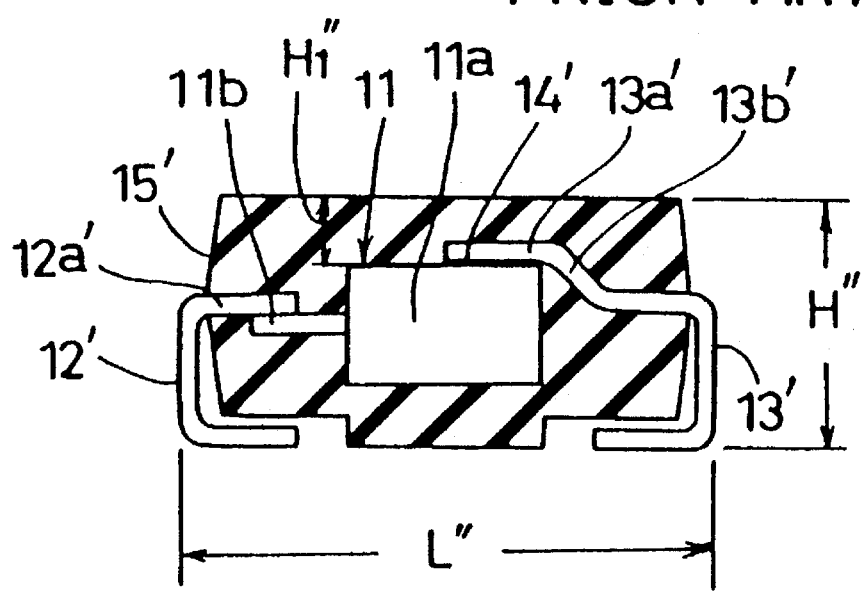

FIG. 14 shows the successive steps of making the capacitor according to the fourth embodiment. The respective steps, which substantially correspond to those already described in connection with FIG. 4, are not specifically described here to avoid repetition.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A package-type solid electrolytic capacitor comprising:
   a capacitor chip having a first end face and a second end face opposite to the first end face, the chip being formed with a cathode terminal coating at least covering the second end face;

an anode wire partially projecting from the first end face of the chip;

a plate-like metal anode lead having an inner end electrically connected to the anode wire;

a plate-like metal cathode lead having an inner end which has an upper face, a lower face opposite to the upper face and an inner face located between the upper face and the lower end face, the inner end of the cathode lead being electrically connected to the cathode terminal coating of the chip; and a resin package enclosing the capacitor chip, the anode wire and the inner ends of the anode and cathode leads;

wherein the cathode lead has a wider portion projecting out of the resin package, the inner end of the cathode lead being narrower than the wider portion of the cathode lead, the inner end face of the cathode lead being held in abutment with and electrically connected to the cathode terminal coating at the second end face of the chip.

2. The capacitor according to claim 1, wherein the inner end of the cathode lead is rendered narrower by tapering the inner end of the cathode lead.

3. The capacitor according to claim 1, wherein the inner end of the cathode lead is rendered narrower by rectangularly cutting out the cathode lead on both sides of the inner end of the cathode lead.

4. The capacitor according to claim 1, wherein the inner end of the cathode lead is rendered narrower by obliquely cutting out the cathode lead only on one side of the inner end of the cathode lead, the cathode lead being laterally offset relative to the anode lead.

5. The capacitor according to claim 1, wherein the inner end of the cathode lead is rendered narrower by rectangularly cutting out the cathode lead only on one side of the inner end of the cathode lead, the cathode lead being laterally offset relative to the anode lead.

6. The capacitor according to claim 1, wherein the inner end of the cathode lead is bent within the resin package.

7. The capacitor according to claim 1, wherein the inner end of the anode lead is attached to a lower face of the anode wire, the respective inner ends of the anode and cathode leads being contained in a common plane which is parallel to a bottom face of the resin package.

8. The capacitor according to claim 1, wherein the inner end of the anode lead is attached to an upper face of the anode wire, the respective inner ends of the anode and cathode leads being contained in a common plane which is parallel to a bottom face of the resin package.

9. The capacitor according to claim 1, wherein the inner end of the cathode lead is attached to the cathode terminal coating of the chip by an electrically conductive paste.

10. The capacitor according to claim 9, wherein the electrically conductive paste is selected from a group consisting of a metal paste and an electrically conductive resin paste.

* * * * *